US009221487B2

(12) United States Patent
Doucette et al.

(10) Patent No.: US 9,221,487 B2
(45) Date of Patent: Dec. 29, 2015

(54) CONVERTIBLE STROLLER SEAT

(71) Applicants: Louis Doucette, Acworth, GA (US);
Devon Siesholtz, Boyertown, PA (US);
Richard Wyant, Phillipsburg, NJ (US);
Andrew Serbinski, Annandale, NJ (US)

(72) Inventors: Louis Doucette, Acworth, GA (US);
Devon Siesholtz, Boyertown, PA (US);
Richard Wyant, Phillipsburg, NJ (US);
Andrew Serbinski, Annandale, NJ (US)

(73) Assignee: Graco Children's Products Inc.,
Atlanta, GA (US)

( * ) Notice: Subject to any disclaimer, the term of this patent is extended or adjusted under 35 U.S.C. 154(b) by 0 days.

(21) Appl. No.: 14/266,810

(22) Filed: Apr. 30, 2014

(65) Prior Publication Data

US 2014/0319884 A1    Oct. 30, 2014

Related U.S. Application Data

(60) Provisional application No. 61/817,867, filed on Apr. 30, 2013.

(51) Int. Cl.
B60N 2/34 (2006.01)
B62B 7/00 (2006.01)
B62B 9/10 (2006.01)
B62B 7/12 (2006.01)

(52) U.S. Cl.
CPC . B62B 7/00 (2013.01); B62B 7/123 (2013.01); B62B 9/104 (2013.01)

(58) Field of Classification Search
CPC ........... B60N 2/34; B62B 9/104; B62B 7/123

USPC ........... 280/47.34, 47.38, 47.4, 31, 642, 643, 280/38, 639, 647, 648, 650, 657, 658; 297/118
See application file for complete search history.

(56) References Cited

U.S. PATENT DOCUMENTS

| 3,330,575 | A | * | 7/1967 | Boudreau | 280/648 |
| 4,438,941 | A | * | 3/1984 | Guillaume | 280/47.4 |
| 4,597,116 | A | * | 7/1986 | Kassai | 5/99.1 |
| 4,836,573 | A | | 6/1989 | Gebhard | |
| 5,547,256 | A | * | 8/1996 | D'Antuono et al. | 297/377 |
| 5,772,235 | A | * | 6/1998 | Espenshade | 280/643 |
| 5,819,341 | A | | 10/1998 | Simantob et al. | |
| 5,833,261 | A | | 11/1998 | Brown et al. | |
| 5,988,670 | A | * | 11/1999 | Song et al. | 280/648 |
| 6,196,629 | B1 | | 3/2001 | Onishi et al. | |
| 6,701,547 | B2 | | 3/2004 | Hsia | |
| 7,338,127 | B2 | | 3/2008 | Church | |

(Continued)

FOREIGN PATENT DOCUMENTS

CN    1590181    3/2005
CN    201022542    2/2008

(Continued)

Primary Examiner — John Walters
Assistant Examiner — Brian Swenson
(74) Attorney, Agent, or Firm — Sutherland Asbill & Brennan LLP

(57) ABSTRACT

A child seat has a seat bottom and a seat back pivotally joined to the seat bottom at a seat bight. The seat back and seat bottom are movable between a toddler seat position with the seat back raised to a non-parallel orientation relative to the seat bottom and a lie flat position with the seat back lowered to a generally parallel orientation relative to the seat bottom. A bassinet rail assembly has a foot rail portion and a head rail portion and is able to move to a bassinet wall configuration around a perimeter of and elevated above the child seat when the seat back is in the lie flat position.

20 Claims, 13 Drawing Sheets

(56) References Cited

U.S. PATENT DOCUMENTS

| | | | |
|---|---|---|---|
| 7,497,461 B2 | 3/2009 | Emerson | |
| 7,726,683 B2 | 6/2010 | Moriguchi et al. | |
| 8,366,127 B2 * | 2/2013 | Zhong et al. | 280/47.4 |
| 8,651,502 B2 * | 2/2014 | Winterhalter et al. | 280/47.4 |
| 8,657,326 B2 | 2/2014 | Shaanan et al. | |
| 8,672,341 B2 * | 3/2014 | Offord | 280/650 |
| 2007/0132207 A1 * | 6/2007 | Moriguchi et al. | 280/642 |
| 2011/0148058 A1 | 6/2011 | Campos | |
| 2011/0278810 A1 * | 11/2011 | Winterhalter et al. | 280/47.38 |
| 2012/0235450 A1 | 9/2012 | Oren et al. | |
| 2014/0319884 A1 | 10/2014 | Doucette et al. | |

FOREIGN PATENT DOCUMENTS

| | | |
|---|---|---|
| CN | 100387471 C | 5/2008 |
| CN | 201847244 | 6/2011 |
| CN | 102416973 | 4/2012 |
| CN | 202557593 | 11/2012 |
| DE | 29509287(U1) | 8/1995 |
| DE | 29509288(U1) | 8/1995 |
| DE | 29509346(U1) | 8/1995 |
| DE | 10336167 | 2/2005 |
| EP | 0885577 | 12/1998 |
| EP | 1031490 | 8/2000 |
| EP | 1481616 | 12/2004 |
| EP | 2289762 | 3/2011 |
| EP | 2404807 | 1/2012 |
| ES | 2240879 | 10/2005 |
| ES | 2244950 | 12/2005 |
| ES | 2324550 | 8/2009 |
| FR | 2859154 | 3/2005 |
| GB | 2163045 | 2/1986 |
| GB | 2290025 | 12/1995 |
| GB | 2290229 | 12/1995 |
| GB | 2290465 | 1/1996 |
| GB | 2315014 | 1/1998 |
| GB | 2405380 | 3/2005 |
| GB | 2482611 | 2/2012 |
| JP | 2008272212 | 11/2008 |
| NL | 1023758(C2) | 12/2004 |
| WO | WO9812094 | 3/1998 |
| WO | WO2006034615 | 4/2006 |

* cited by examiner

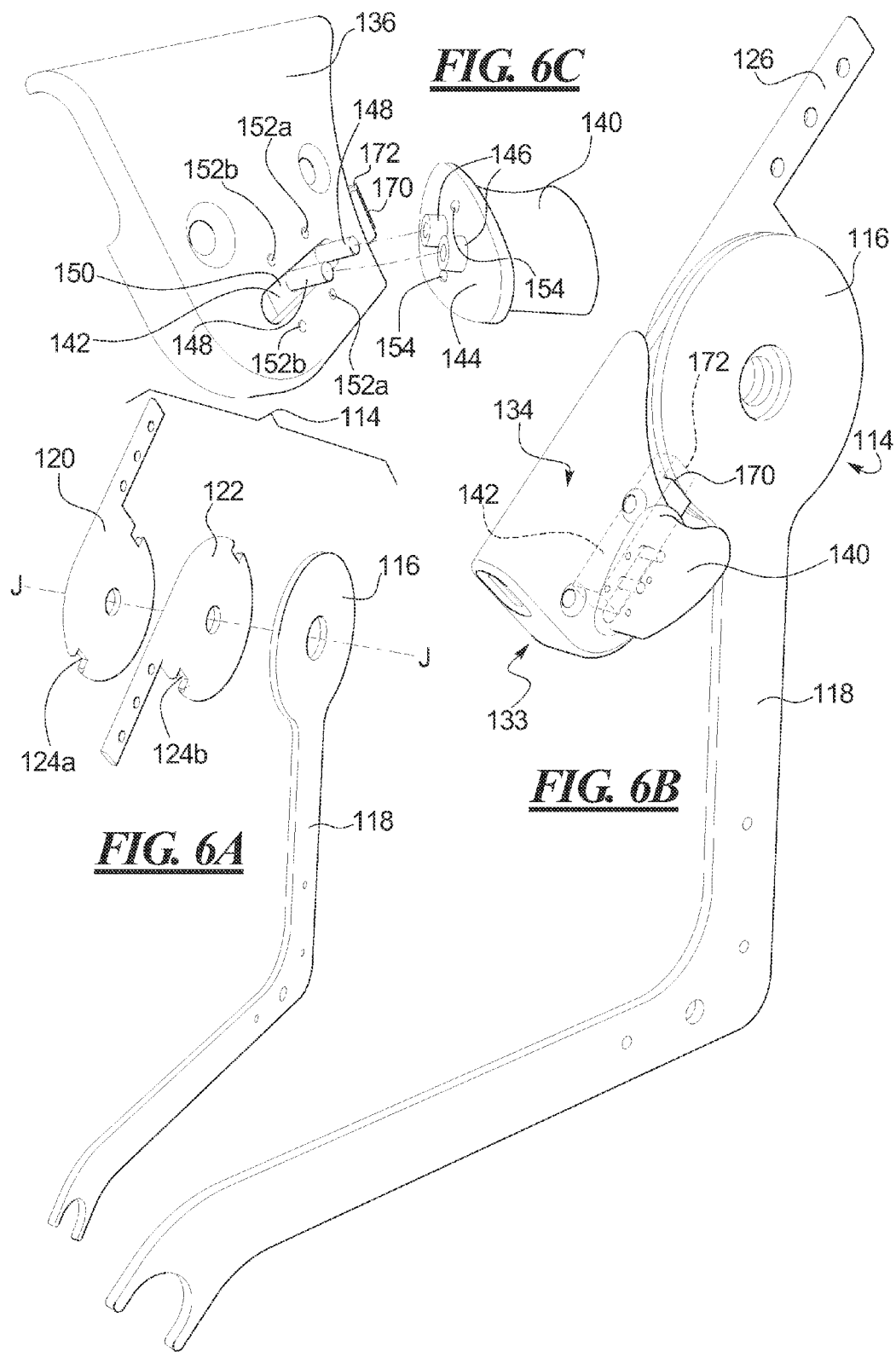

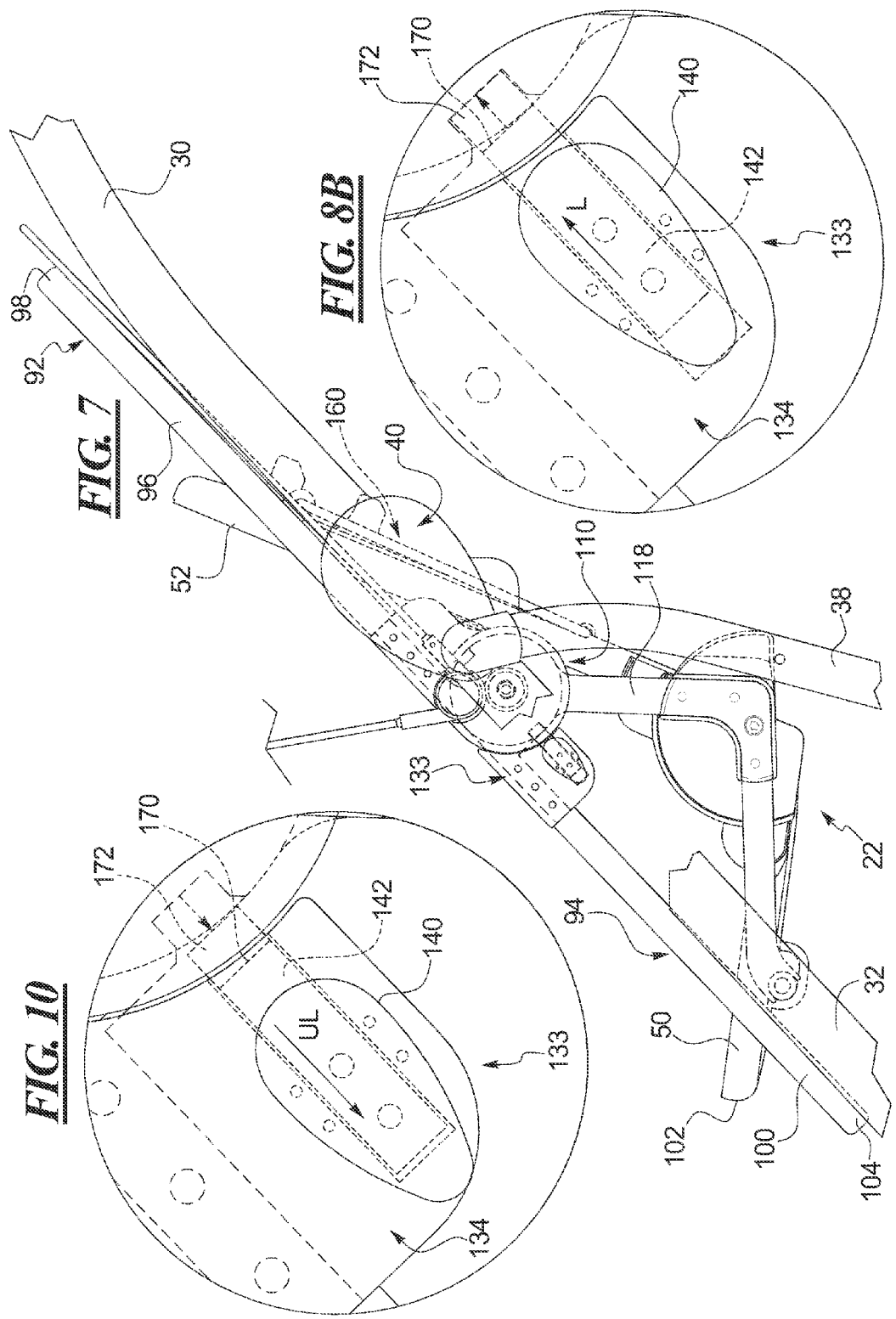

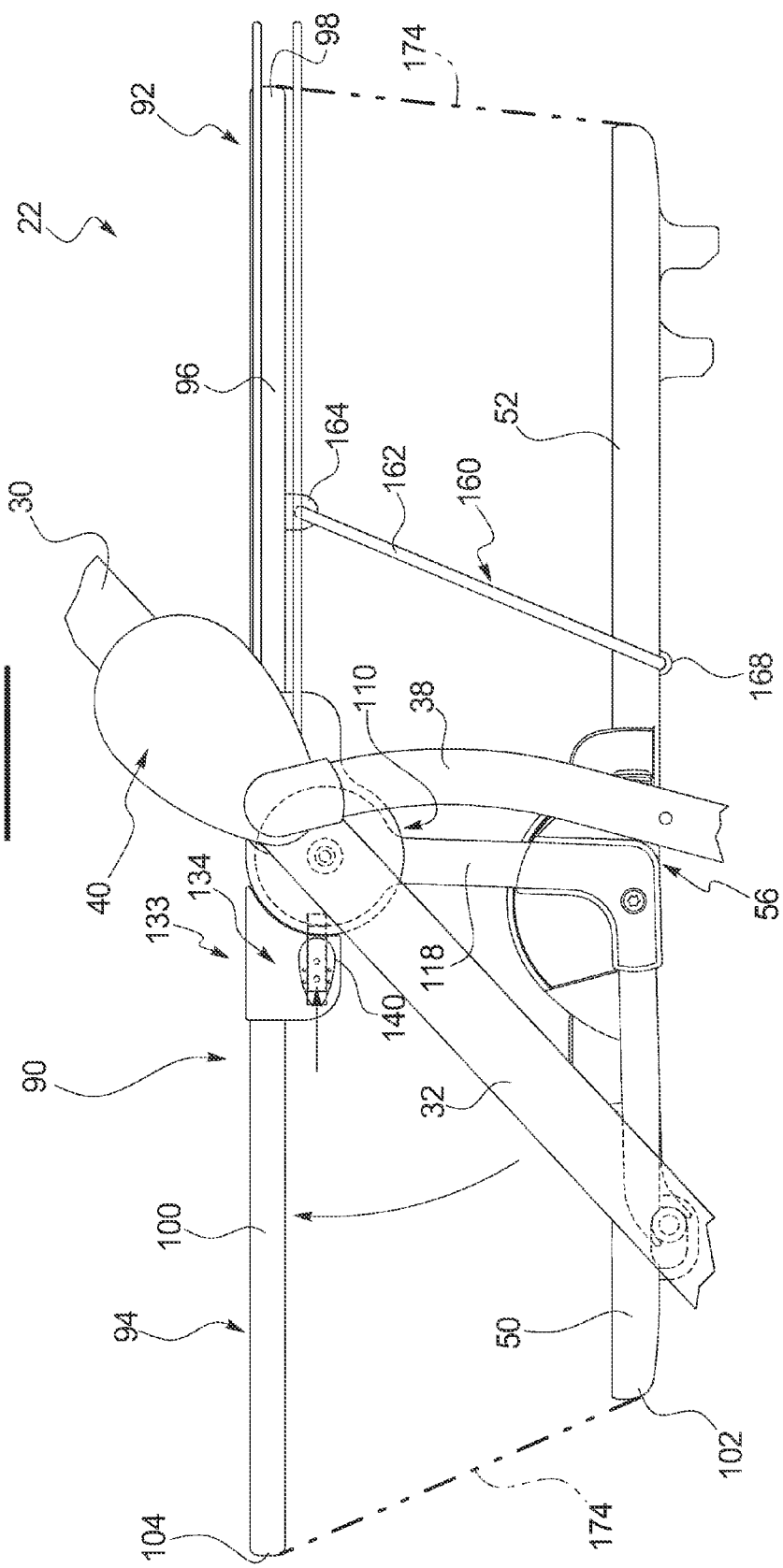

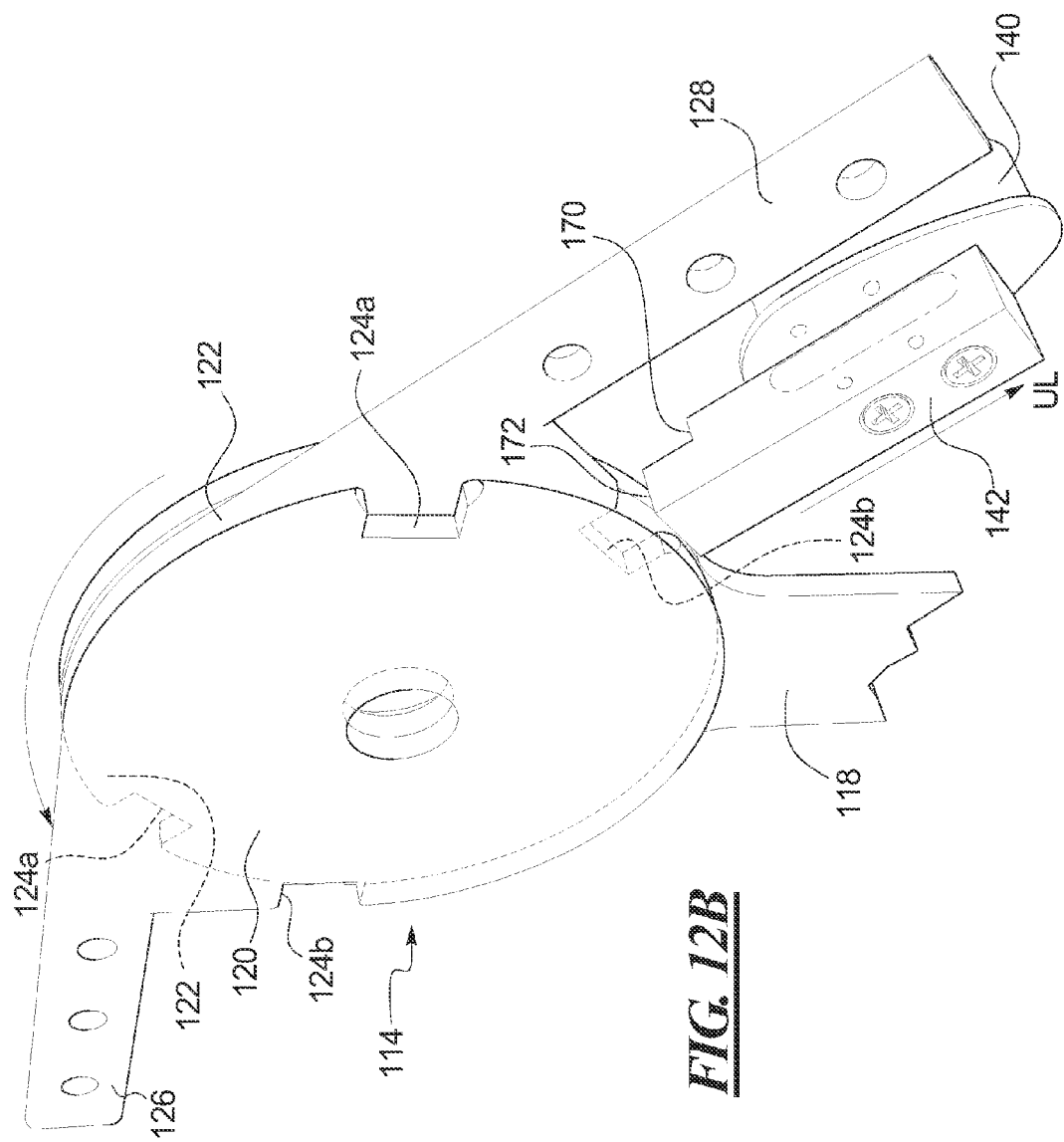

CONVERTIBLE STROLLER SEAT

RELATED APPLICATION DATA

This patent is related to and claims priority benefit of U.S. provisional application Ser. No. 61/817,867 filed Apr. 30, 2013 and entitled "Convertible Stroller Seat." The entire content of this prior filed provisional application is hereby incorporated herein by reference.

BACKGROUND

1. Field of the Disclosure

The present disclosure is generally directed to strollers, and more particularly to a stroller seat that is convertible between a seat configuration and a bassinet configuration while attached to a stroller frame.

2. Description of Related Art

Strollers and similar products are known in the art for providing a mechanism for parents and caregivers to transport children. Strollers typically have a seating area to support a child on the stroller while being transported. Many known strollers have only one non-adjustable seating configuration for the child. In addition, many of these types of products are not suited to allow different age-dependent seating arrangements for an infant or a child occupant as they grow. Some stroller seats do have a seat with a seat back that can be adjusted among two or more seat incline angles.

Some strollers are designed to offer a seat configuration that can accommodate a specific age range or size range of children from newborns to toddlers. Some strollers are designed to only accommodate infants, and other strollers are designed to only accommodate older children. Strollers that accommodate newborns can have a seat that can be positioned in a "lie flat" configuration. Strollers that accommodate older children can have an upright seating configuration. Positions between upright and lie flat can be achieved in some strollers by reclining the seat back, as noted above, to varying angles. In a lie flat configuration, some strollers may encompass the envelope of the flat seat back and seat bottom with "walls" for a child's safety and security. In some strollers, one part of the wall can be formed by a head pan of the stroller seat, which is attached to a top end of the seat back, and that becomes reoriented relative to the remainder of the seat back when the seat back is lowered.

There are some known convertible child seats, such as a form of a bouncer seat offered by Tiny Love, that are not readily adaptable to be used on a stroller or other juvenile product. Such seats are typically stand-alone seats. The Tiny Love seats are not adapted to be fixed to a stroller frame or be mountable to and removable from any frame structure.

SUMMARY

In one example according to the teachings of the present disclosure, a child seat has a seat bottom and a seat back pivotally joined to the seat bottom at a seat bight. The seat back and seat bottom are movable between a toddler seat position or upright seat mode and a lie flat position or bassinet mode with the seat back lowered to a generally parallel orientation relative to the seat bottom. The child seat has a bassinet rail assembly including a foot rail portion and a head rail portion. The bassinet rail assembly is able to move to a bassinet wall configuration around a perimeter of and elevated above the child seat when the seat back is in the lie flat position or bassinet mode.

In one example, the child seat can be joined to a frame assembly of a stroller or another juvenile product. The connection can be on each side of the child seat.

In one example, the child seat can have a rail lock that, when in a locked position, moves the foot rail portion up to the bassinet wall configuration when the seat back is lowered to the lie flat position. This can occur when the head rail portion drops to the bassinet wall configuration as the seat back is lowered. In an unlocked position, the foot rail portion may not move up to the bassinet wall configuration when the seat back is lowered to the lie flat position.

In one example, when the child seat is in the lie flat position the foot rail portion can be selectively lowered so that a forward end of the foot rail portion is level with or below an elevation of a front edge of the seat bottom.

In one example, the child seat can be attachable to a frame assembly of a stroller and removable from the frame assembly and usable as a separate bassinet.

In one example, the child seat can include a rail joint assembly pivotally connecting the foot rail portion with the head rail portion. A rail lock can selectively couple or decouple the two rail portions to one another for movement in concert or for independent movement.

BRIEF DESCRIPTION OF THE DRAWINGS

Objects, features, and advantages of the present invention will become apparent upon reading the following description in conjunction with the drawing figures, in which:

FIG. 6A shows an enlarged exploded view of stacked plate portions of the rail joint assembly of FIG. 5.

FIG. 6B shows a partially assembled view of the rail joint assembly of FIG. 5, with an otherwise hidden lock pin of a bassinet rail lock shown in phantom.

FIG. 6C shows a partially exploded view of the rail lock of the rail joint assembly of FIGS. 5 and 6B.

FIG. 7 shows a side view of parts of the stroller and child seat of FIGS. 1 and 2 and with otherwise hidden components shown in phantom.

FIG. 8B shows a close up view of the rail lock in the locked position of FIG. 8A and with otherwise hidden components shown in phantom.

FIG. 9A shows a side view of part of the stroller and child seat of FIG. 4 in the lie flat position or bassinet mode.

FIG. 10 shows the rail lock of FIG. 8B but in an unlocked position.

FIG. 12B shows a close-up perspective view of the parts of the rail joint assembly in FIG. 8A, but with the child seat and the rail joint assembly in the lie flat toddler mode of FIGS. 11 and 12A.

DETAILED DESCRIPTION OF THE DISCLOSURE

The disclosed child seat examples and stroller examples solve or improve upon one or more of the above-noted and/or other problems and disadvantages with prior known strollers and child seats. A child seat is disclosed herein that can be converted or moved between at least two different configurations or positions. The disclosed child seat in one example incorporates a novel seating area that transitions from an upright toddler seating seat position to a lie flat infant bassinet position. In one example, the disclosed child seat in the upright seating position is arranged to support a toddler occupant in a sitting position. In one example, the disclosed child seat in the lie flat bassinet position is arranged to support an infant occupant in a supine or lying down position. In one example, the disclosed child seat is surrounded by a bassinet wall in the lie flat position, forming a bassinet configuration that deploys as the seat back is lowered. In one example, the disclosed child seat can also be arranged to support a toddler occupant in a supine or sleeping position with a portion of the bassinet wall lowered. These and other objects, features, and advantages of the disclosed child seat examples and stroller seat examples will become apparent to those having ordinary skill in the art upon reading this disclosure.

Although the disclose child seat and stroller are disclosed in one fairly specific embodiment with a fairly specific combination of features, components, and functions, it should be understood that each feature, component, function, and aspect of the disclosure can be employed separately in a stroller or child seat or can be employed in combination with one or more other features, components, functions, or aspects of the disclosure.

Figure 1:
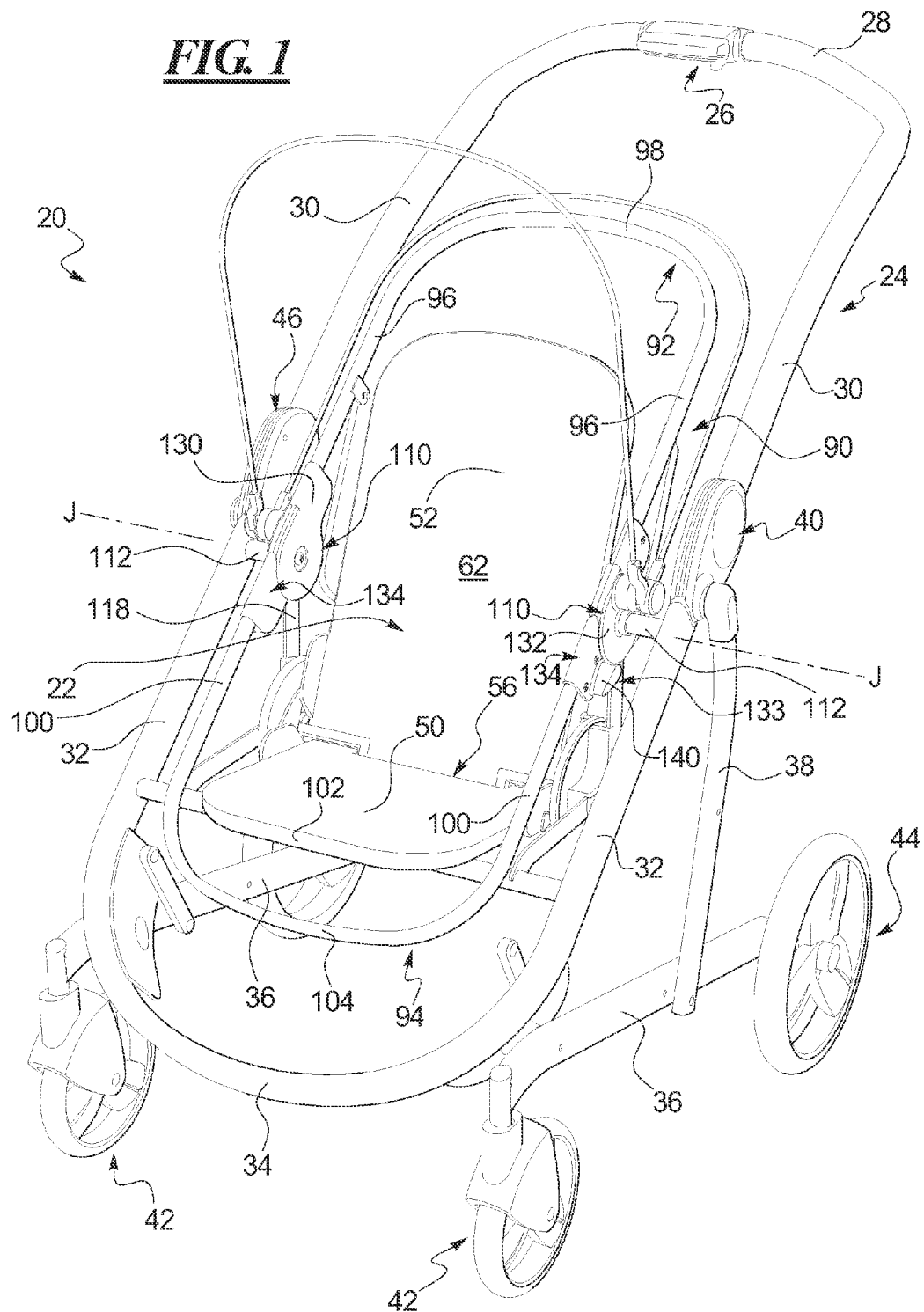
FIG. 1 shows a front perspective view of one example of a stroller with a child seat attached thereto and constructed in accordance with the teachings of the present disclosure, the seat shown in an upright seat mode or toddler seat position.
Figure 2:
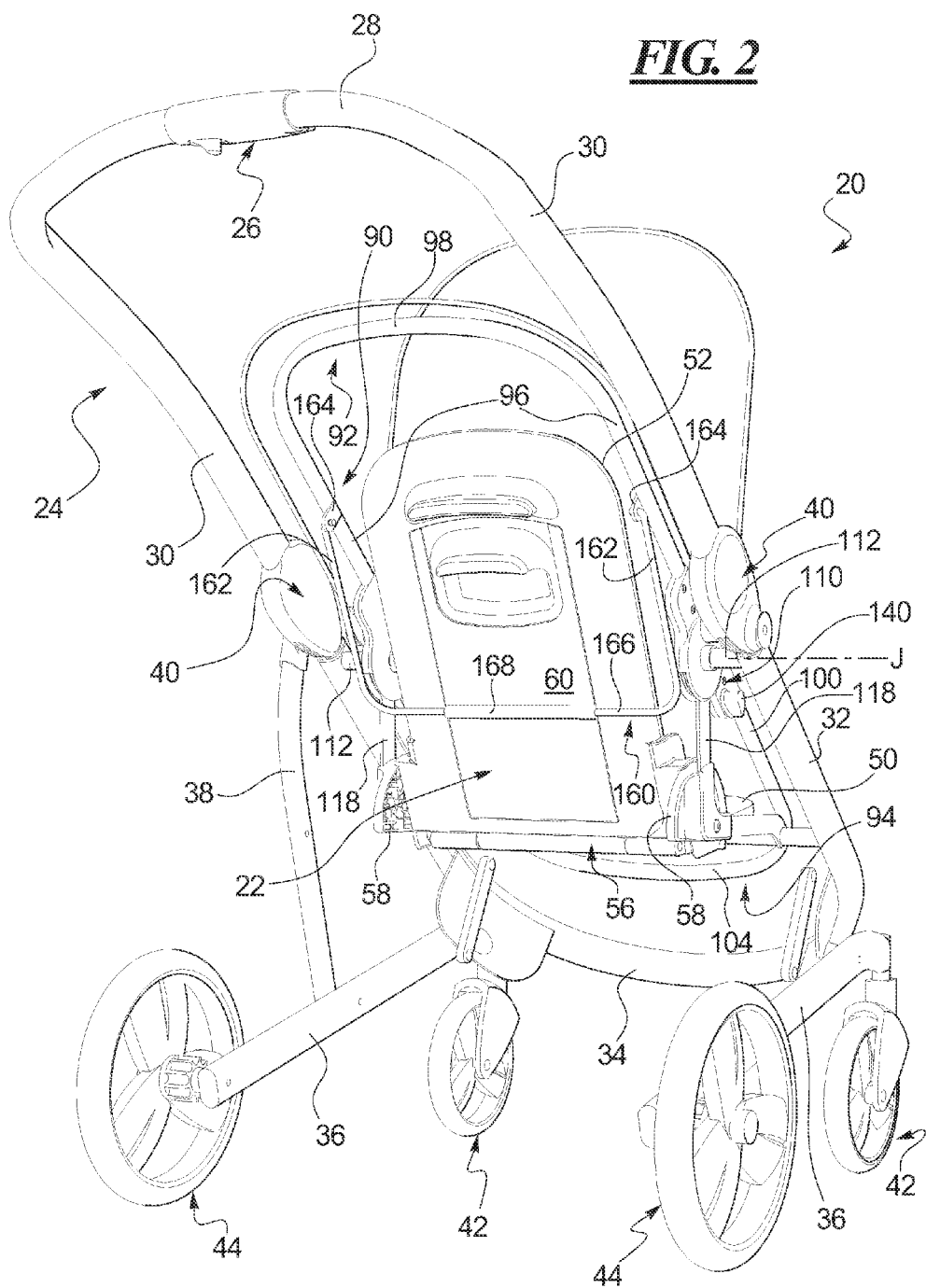
FIG. 2 shows a rear perspective view of the stroller and child seat of FIG. 1.

Turning now to the drawings, FIGS. 1 and 2 show one example of the stroller 20 that has a child seat 22 constructed according to the teachings of the present disclosure. The construction of the stroller 20 can vary considerably within the spirit and scope of the present disclosure. In this example, the stroller 20 has a frame assembly with left and right sides. The frame assembly generally has a handle assembly 24 with a fold actuator 26 on a handle bar 28. The handle bar 28 extends between left and right side push arms 30 of the handle assembly 24. The frame assembly also has a front leg assembly with left and right side front legs 32 connected by a transverse lower cross-bar 34. The frame assembly also has left and right side bottom rails 36 and rear legs 38.

Forward ends of the bottom rails 36 are connected to the front leg assembly near the front legs 32. Lower ends of the rear legs 38 are connected to the bottom rails 36. Upper ends of the rear legs 38 are connected to left and right side fold joints 40 of the frame assembly. Upper ends of the front legs 32 and lower ends of the push arms 30 are also connected to the fold joints 40. As is known in the art, though not shown herein, the stroller 20 can be foldable about the fold joints 40 from the in-use or unfolded configuration shown in FIGS. 1 and 2 to a folded configuration for compact storage. The fold actuator is operably connected to the fold joints 40 to release the fold joints and to permit folding, as is known in the art.

The stroller 20 also has front wheels 42 and rear wheels 44 on which the frame assembly is supported and can roll along a surface. The front wheels 42 are mounted to the front ends of the bottom rails 36 and the rear wheels 44 are mounted to the rear ends of the bottom rails in this example. As noted above, the construction and component arrangement of the frame assembly of the stroller 20 can vary considerably within the spirit and scope of the present disclosure. The stroller 20 and frame assembly need not take the form shown and described herein.

The child seat 22 in this example is also illustrated in FIGS. 1 and 2 as generally having a seat bottom 50 and a seat back 52 joined to one another in a pivotable manner along a seat bight region 54. The seat bottom 50 and seat back 52 can also vary in configuration and construction. In this example, the seat bottom 50 and seat back 52 are shown as solid, generally flat panel elements. However, these components can be contoured to better fit the shape of a child, can be perforate, can be covered with seat padding, fabric, and the like, and/or can have ribs, flanges, and the like to add structural rigidity. The panel elements can be formed of one single part or two or more parts, as desired.

Figures 3A, 3B:
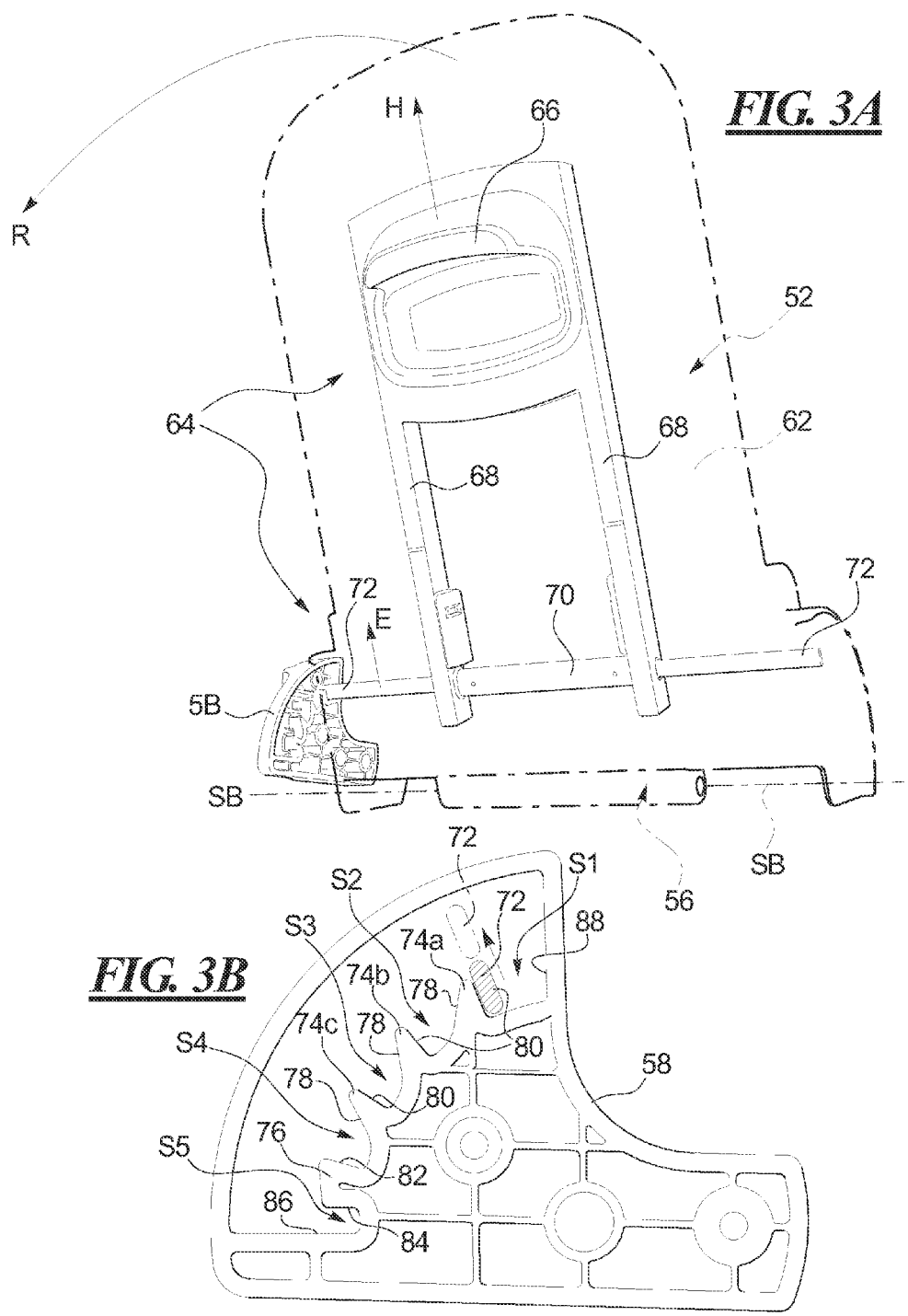
FIG. 3A shows a portion of the child seat of FIG. 2 depicting operation of a recline mechanism for the child seat.
FIG. 3B shows a close-up side view of a ratchet portion of the recline mechanism of FIGS. 2 and 3A.

As shown in FIGS. 1 and 2, the seat back 52 has a recline mechanism configured to recline or lower the seat back 52 relative to the seat bottom 50. The in one example, the recline mechanism can have a recline hub 58 carried by the frame assembly at each side of the child seat 22. The seat back 52 can be pivotally connected to the recline hubs 58. FIGS. 3A and 3B show the recline hubs 58 and the seat back 52 with a back panel portion 60 (see FIG. 2) removed. Thus, the seat back 52 is formed of at least two parts including the back panel portion 60 and a front panel portion 62 (see FIG. 1) attached thereto and defining a seating surface side of the seat back. As shown in FIGS. 2 and 3A, the recline mechanism also has a recline actuator 64 slidably mounted to the seat back 52 between the two panels 60, 62. The recline actuator 64 has a handle 66 exposed on the rear of the seat back. The handle 66 is connected to two depending links 68 in this example. The links 68 are joined to an adjustment rod 70 that traverses the seat back 52 near the lower end. The adjustment rod 70 and links 68 are captured between the two seat back panel portions 60, 62 in this example. Exposed ends or engagement pins 72 of the adjustment rod 70 protrude from opposite sides of the seat back 52 and can engage portions of the recline hubs 58.

As shown in FIG. 3B, each recline hub 58 defines a seat back pivot axis SB at the seat bight 56 of the child seat 22. The seat back 52 can pivot relative to the seat bottom 50 about the pivot axis SB. Each recline hub also has a plurality of ramped ratchet teeth 74a-c and an additional, lowermost tooth 76 that are spaced radially from the pivot point SB. Each of the teeth 74a-74c, other than a lowermost tooth 76, is configured to receive an exposed end or engagement pin 72 of the adjustment rod 70 therein. One side or ratchet side 78 of each ratchet tooth 74a-74c is angled or ramped to permit raising the seat back 52, as described below, without having to actuate the handle 66. The other side or stop side 80 of each tooth 74a-74c is angled to prevent the seat back from being lowered without first actuating the handle 66. Each side 82, 84 of the lowermost tooth 76 is configured or angled so as to require the handle 66 to be actuated to move the seat back, also as described below.

The recline hubs 58 each defines five tooth slots S1-S5 between each of the teeth 74a-74c and 76, between the tooth 76 and a bottom hard stop 86, and between the tooth 74a and an upper hard stop 88. The hard stops 86, 88 are formed as a part of the recline hubs 58 in this example. The exposed ends or engagement pins 72 seat in one of the slots S1-S5 between the teeth 74a-74c, 76, and or the hard stops 86, 88, depending on the position of the seat back 52. With reference to FIGS. 3A and 3B, with the seat back 52 in a most upright orientation as shown in FIGS. 1-3A, the engagement pins 72 rest in the tooth slots 51 and bear against the stop side 80 of the uppermost teeth 74a in each of the recline hubs 58. The hard stop 88 on one side, the shape of the stop side 80 on the other side, and the shape of the engagement pins 72 prevent the pins from bypassing the teeth 74a. This prevents the seat back 52 from being moved or pivoted relative to the seat bottom 50.

To change the seat back angle or recline angle of the seat back 52, the user can pull up or squeeze the handle 66 in the direction of the arrow H in FIG. 3A. This in turn will lift or disengage the engagement pins 72 in the direction of the arrow E from the tooth slots 51 to clear the teeth 74a as shown in phantom in FIG. 3B. The seat back 52 can now be pivoted or lowered in a rearward direction depicted by the arrow R in FIG. 3A to change the seat back angle. The release actuator 64 can have a biasing mechanism or spring (not shown) virtually anywhere along the components of the actuator. Such a mechanism or spring biases the handle downward. When the seat is in the desired orientation, the handle 66 can be released and the biasing mechanism or spring will fire the engagement pins 72 into the closest aligned slots in the recline hubs as selected by the user.

The tooth slots S1-S4 define four different obtuse recline angles for the seat back, each less than 180° relative to the seat bottom. These additional recline angles are optional, other than one upright or toddler seating position, such as the most upright seat angle, which is also preferably an obtuse angle greater than 90° for the ergonomic comfort of the seat occupant. This most upright position is shown in FIGS. 1-3A and is herein defined as the toddler seating position. The seat back angle for the upright toddler seating position is, however, not limited to any particular seat back incline or recline angle relative to the seat bottom. The angle should be an obtuse angle greater than 90° for the ergonomic comfort of the seat occupant. The remaining slots S2-S4 define optional user selectable seat back recline angles between the toddler seating position and 180° in this example. The purpose and function of the lowermost slot S5 is discussed in greater detail below.

Figure 4:
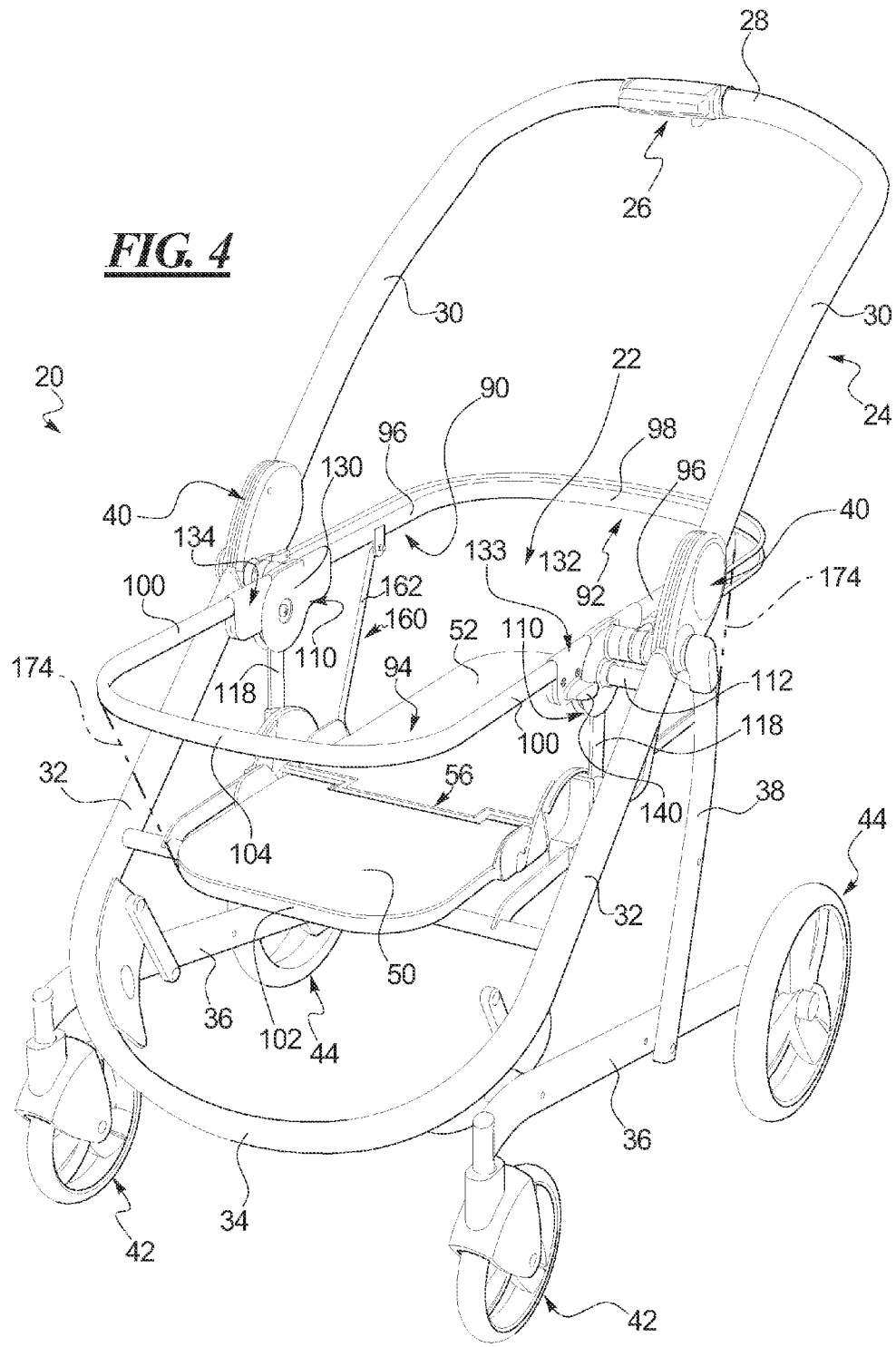
FIG. 4 shows a front perspective view of the stroller and child seat of FIG. 1, but with the child seat in a lie flat position or bassinet mode.

In the disclosed example, the child seat 22 is capable of being moved and rearranged between at least the one toddler seating position, i.e., an upright seat mode, and a lie flat position or bassinet mode, as shown in FIG. 4. In the bassinet mode or lie flat position, the seat back 52 is reclined or lowered until it (or its seating surface) is generally parallel with the seat bottom 50 (or its seating surface). In this mode, a child or an infant can lie in a supine position on the combined seating surfaces of the seat bottom 50 and seat back 52. With reference to FIG. 3B, in the bassinet mode, the engagement pins 72 will seat in the lowermost slots S5 between the tooth 76 and the lower hard stop 86 of the recline hubs 58. The engagement pins 72 are captured between the hard stop 86 and the stop side 84 on the tooth 76. The stop side 84 is not a ramped or ratchet surface. Thus, the seat back 52 cannot be raised up without first actuating the handle 66 so that the pins 72 clear the teeth. This locks or retains the child seat 22 in the lie flat position or bassinet mode. By comparison, the seat back 52, with the engagement pins 72 in any one of the slots S2-S4 can be pushed or raised up toward the slot S1 without having to actuate the handle 66. The ratchet surfaces 78 on the teeth 74a-74c are ramped or angled to allow the engagement pins 72 to bypass the teeth against the force of the biasing mechanism or spring of the recline actuator 64.

The child seat 22 is equipped in this example with a movable bassinet rail assembly 90 that resides along or near the sides of the child seat in the toddler seating position or upright seat mode. As shown in FIGS. 1, 2, and 4, the bassinet rail assembly 90 has a head rail portion 92 and a foot rail portion 94. The head rail portion 92 has a pair of spaced apart side rail segments 96 and a cross rail segment 98 connecting the free ends of the side segments. With the seat in the toddler seating position of FIGS. 1 and 2, the side rail segments 96 extend upward and rearward along the sides of the child seat 22 positioning the cross rail segment 98 above and behind the seat back 52. The foot rail portion 94 has a pair of spaced apart side segments 100 that extend generally forward and down in the direction of a front edge 102 of the seat bottom 50. The foot rail portion 94 also has a cross rail 104 extending between and connecting free ends of the side segments 100. In the upright seat mode, the cross rail segment 104 is positioned below the front edge 102 of the seat bottom in this example, but nearly vertically aligned with or even forward of the front edge. The cross rail segment 104 can thus function as a foot rest or a calf support for the child seat 22 when in the toddler seating position or upright seat mode. In this seat configuration, the head rail portion 92 and foot rail portion 94 can lie generally in the same plane as depicted in FIG. 2.

Figure 5:
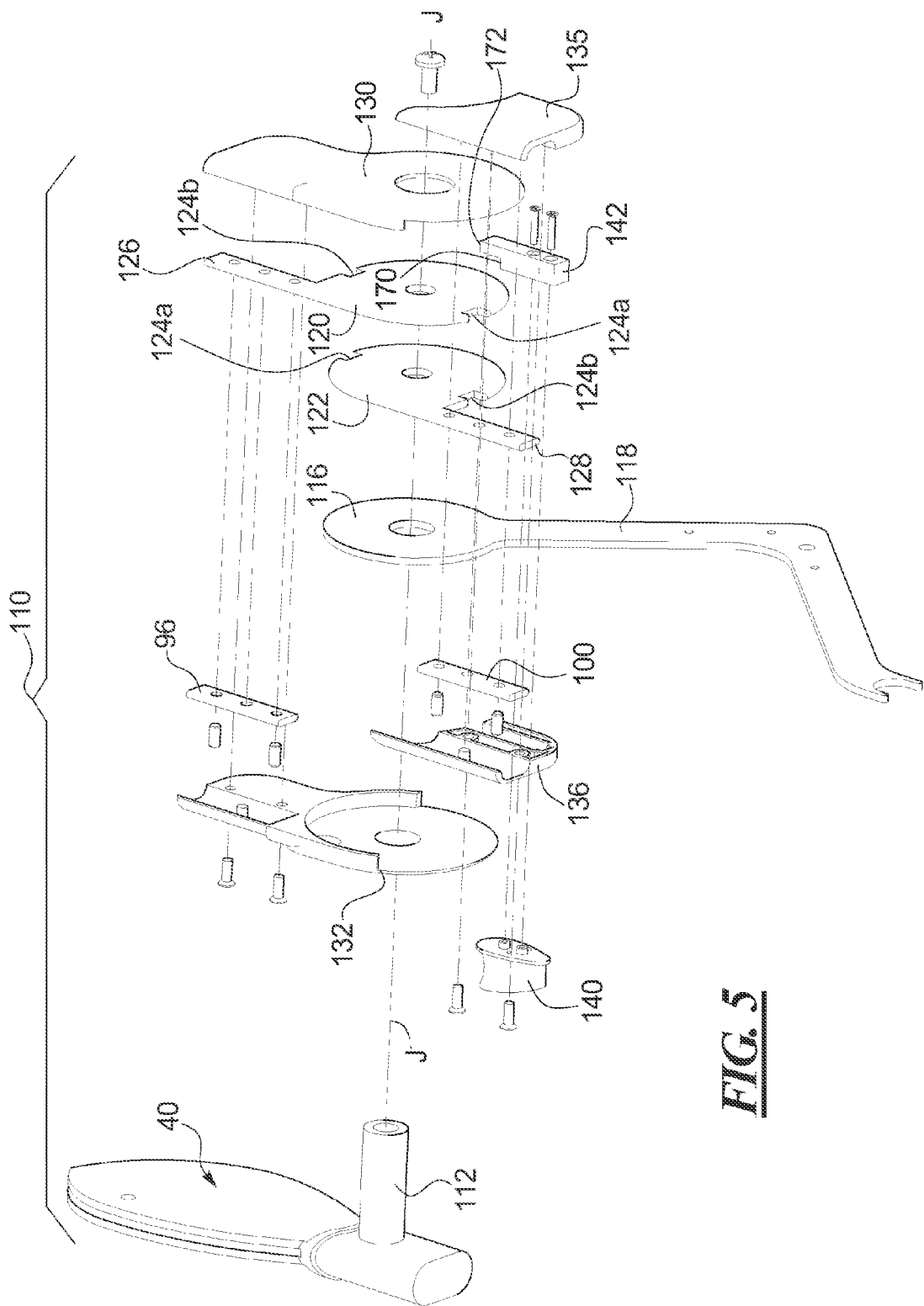
FIG. 5 shows an exploded view of a right side rail joint assembly of the stroller and child seat of FIG. 1.

In this example, the child seat 22 also has a bassinet rail joint assembly 110 on each side of the seat, which can again be seen in FIGS. 1, 2, and 4. FIG. 5 shows an exploded view of one of the rail joint assemblies 110, the right side rail joint assembly. The other rail joint assembly 110, i.e., the left side rail joint assembly can be a substantial mirror image of the one shown. In this example, the child seat 22 is not intended for removal from the stroller 20. In other examples, as mentioned below, the child seat 22 can be configured for intended removal from the stroller 20 to be used on another child seating device or product or as a stand-alone seat or bassinet.

In this example, the stroller fold joint 40 has an optional axle 112 that extends laterally inward from the fold joint. The axle 112 defines a joint pivot axis J for the rail joint assembly 110. A rail hub 114 is mounted for pivoting movement on the axle 112 about the joint axis J. The rail hub 114 includes a series of stacked plates that are disc shaped and selectively rotatable relative to one another about the joint axis J. The rail hub 114 has a fixed plate 116 carried on a post 118, which is L-shaped in this example. The post 118 can be secured to the frame assembly or another part of the stroller 20. In this example, the post 118 is fastened to part of the structure of the recline hub 58 that is carried on the frame assembly, as shown in FIGS. 1 and 2. The fixed plate 116 is stationary and does not rotate about the axle 112 of joint axis J, but has a central opening aligned with the axle 112.

A head rail plate 120 is attached to or carried on the proximal end of the head rail side segment 96. The head rail plate 120 is fixed to the side segment 96 and thus will rotate with movement of the head rail portion 92. A foot rail plate 122 is attached to or carried on the proximal end of the foot rail side segment 100. The foot rail plate 122 is fixed to the side segment 100 and thus will rotate with movement of the foot rail portion 94. The rail plates are shown in FIGS. 5 and 6A. The foot rail plate 122 and head rail plate 120 are stacked against one another and against the inside face of the fixed plate 116 in this example. Each plate 120 and 122 also has a central opening that is concentric with the joint axis J. The perimeter of the fixed plate 116 in this example is circular, other than where it joins to the post 118. The perimeter of the head rail plate 120 and foot rail plate 122 each have two notches 124a, 124b formed 180° apart around the perimeter of the disc shaped plates. This is so that the two plates 120, 122 can be the same part having an identical structure, requiring less tooling to fabricate the parts of the rail joint assembly 110. In this example, one notch 124a on one plate is used and the other notch 124b on the other plate is used, as discussed below. The head rail plate 120 has an extension 126 that is connected to the head rail side segment 96 and the foot rail plate has an extension 128 that is connected to the foot rail side segment 100 to attach the rail plates to the head and foot rail portions 92, 94, respectively.

The rail joint assembly 110 also has an inner cover 130 and an outer cover 132 as shown in FIG. 5 and in FIG. 1. The covers can be attached to the stacked plates 116, 120, 122 to house and hide the plates. The covers can be snap together parts or can be secured using fasteners or other suitable means to the rail joint assembly 110.

A bassinet rail lock 133 can be carried on a portion of the bassinet rail assembly 90 or the rail joint assembly 110. The bassinet rail lock can selectively lock the head rail and foot rail portions together or disengage them from one another for reasons discussed below. In one example, the rail lock has a lock housing 134 with two housing sections including an inner housing section 135 and an outer housing section 136, as shown in FIG. 5. In one example, the housing sections 135, 136 can attach to the foot rail side segment 100, or to the extension 128 on the foot rail plate 122, as shown in FIG. 6B. The lock housing 133 can carry a trigger or lock switch 140 on the exterior of the housing. The lock switch or trigger 140 can be secured to a lock pin 142 housed within a cavity of the housing 133. In one example, as shown in FIG. 6C, the back side 144 of the trigger or switch 140 can have one or more protruding bosses 146 that receive or engage studs 148 protruding from a side of the lock pin 142 to connect the two parts. Fasteners, welding, or other suitable techniques can be used to attach the trigger or switch 140 and lock pin 142, and the studs and/or bosses need not be utilized. The studs 148 on the lock pin 142 can pass through a slot 150 formed through one of the housing sections, such as the outer section 136. The lock switch or trigger 140, and thus the lock pin 142, can be slidable along the slot 150, the travel being limited by the slot length and the lock pin can slide in the housing cavity.

The lock 133 can include detents or other means to provide tactile information to a user as to when the switch or trigger 140 is in a particular position. In one example also depicted in FIG. 6C, an exterior surface of the outer housing can have dimples or recesses, such as two pairs of dimples 152a, 152b arranged along and adjacent the slot 150, one dimple pair at each corresponding end and on opposite sides of the slot. The back side 144 of the switch or trigger 140 can include a pair of complimentary protrusions 154 sized to seat either pair of the dimples 152a or 152b, depending on the position of the switch or trigger 140, as discussed below. The switch or trigger 140 can slide in the direction of the arrows L or UL between an engaged or locked position shown in FIG. 6B with the protrusions 154 seated in the dimple pair 152a to a disengaged or unlocked position with the protrusions seated in the dimple pair 152b (see below).

FIG. 7 shows portions of the stroller 20 and child seat 22 and the rail joint assembly 110 with the child seat in the toddler seating position or upright seat mode of FIGS. 1 and 2. The bassinet rail assembly 90 is also shown along the sides of the seat and oriented at an angle that generally follows the seat orientation. A user can reposition the child seat 22 from the upright seat mode of FIG. 1 to the bassinet mode of FIG. 4 simply by actuating the recline actuator. The user can pull up on or squeeze the handle 66 from the at-rest position of FIG. 3A to a raised release position in the direction of the arrow H, as discussed above. This will release the engagement pins 72 from the uppermost slots S1 in the recline hubs 58. The user can then lower the seat back 52 by pivoting the seat back down about the seat pivot SB in the direction of the arrow R in FIG. 3A. When the seat back is lowered until the pins 72 bottom against the hard stops 86, the seat back is in the lie flat position or bassinet mode position. The handle 66 can be released and the pins 72 can fire into the lowermost slots S5 in the recline hubs 58.

With reference to FIGS. 2, 4, and 7, a rail link 160 is coupled to both the back panel portion 60 of the seat back 52 and the bassinet rail assembly 90. The rail link 160 has two link arms 162 extending between the seat back 52 and the rail assembly 90. A free end of each link arm 162 can be pivotally attached to a corresponding head rail side segment 96, such as by a connector or clip 164. The other ends of the link arms 162 are interconnected by a link cross-member 166 traversing the frame assembly of the stroller 20. The link cross-member 166 is retained in a tunnel 168 across the back panel portion 60 of the seat back 52 and can pivot within the tunnel. However, each end of the link 160, i.e., the free ends of the link arms 162 and the link cross-member 166 are positionally fixed to the respective head rail portion and seat back.

As the seat back 52 is lowered, the link cross-member 166 will drop and move rearward with the seat back. The link cross-member 166 will also pivot within the tunnel 168. As the link rotates and drops, the link arms 162 will pivot in the connectors 164 and also pull down the hear rail potion 92 of the bassinet rail assembly. However, because the seat back 52 and the bassinet rail assembly 90 have two different pivot points, with the rail joint assembly 110 having the pivot axis J being higher than the seat back 52 pivot SB, the head rail portion 92 will not move at the same rate or at the same angle as the seat back 52. The linkage, i.e., the link arm 162 length, the location of the pivot points J and SB, and the position of the link pivot points 164 and 168 can be designed to achieve a desired movement of the bassinet head rail portion 92 as the seat back 52 moves. In this example, the head rail portion 92 is generally or substantially parallel with the seat back 52 in the lie flat position of FIGS. 4 and 9A, but elevated above the seat back.

Figure 8A:
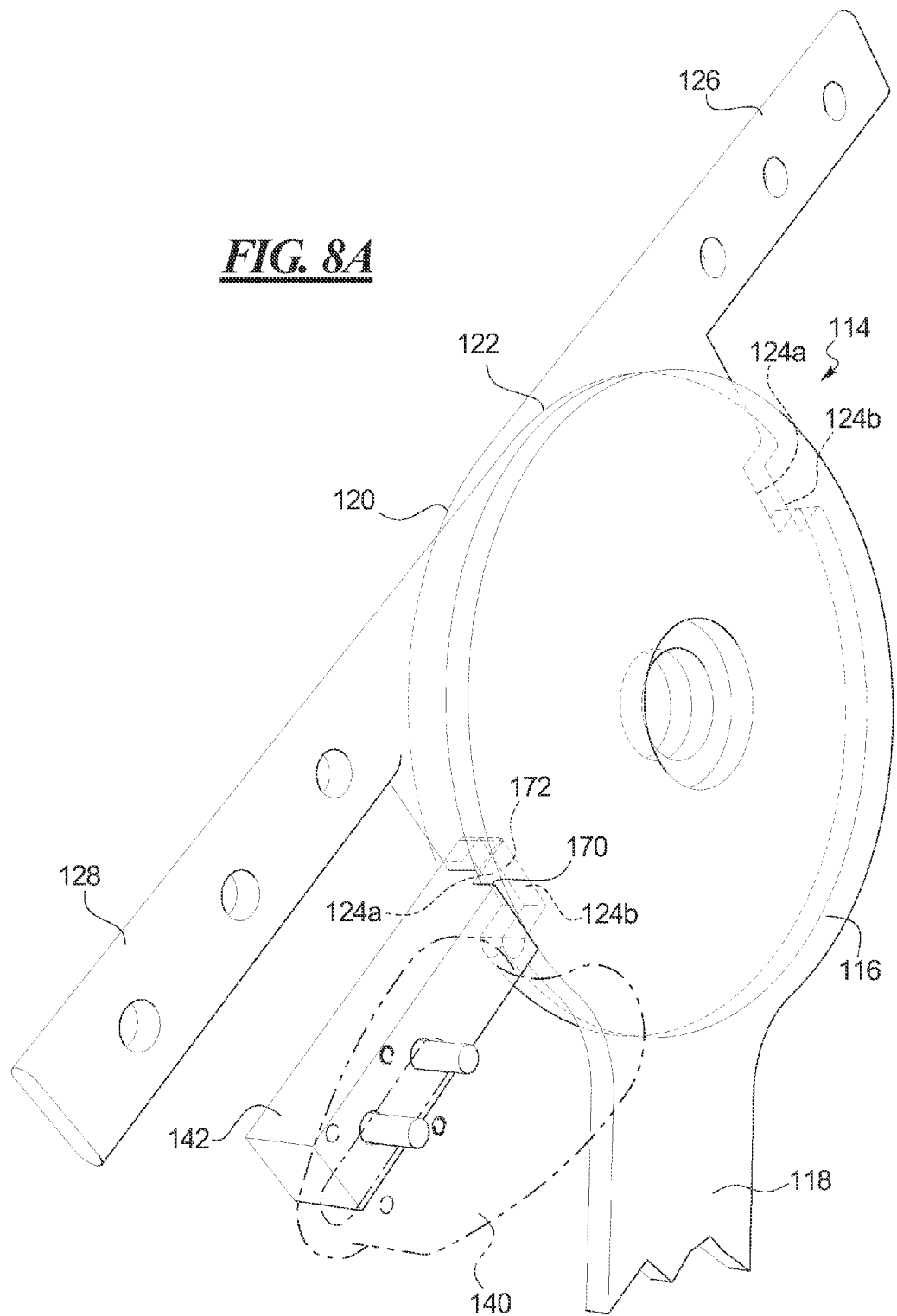
FIG. 8A shows a close-up perspective view of parts of the rail joint assembly of FIG. 7 with the rail lock in a locked position.
Figure 9B:
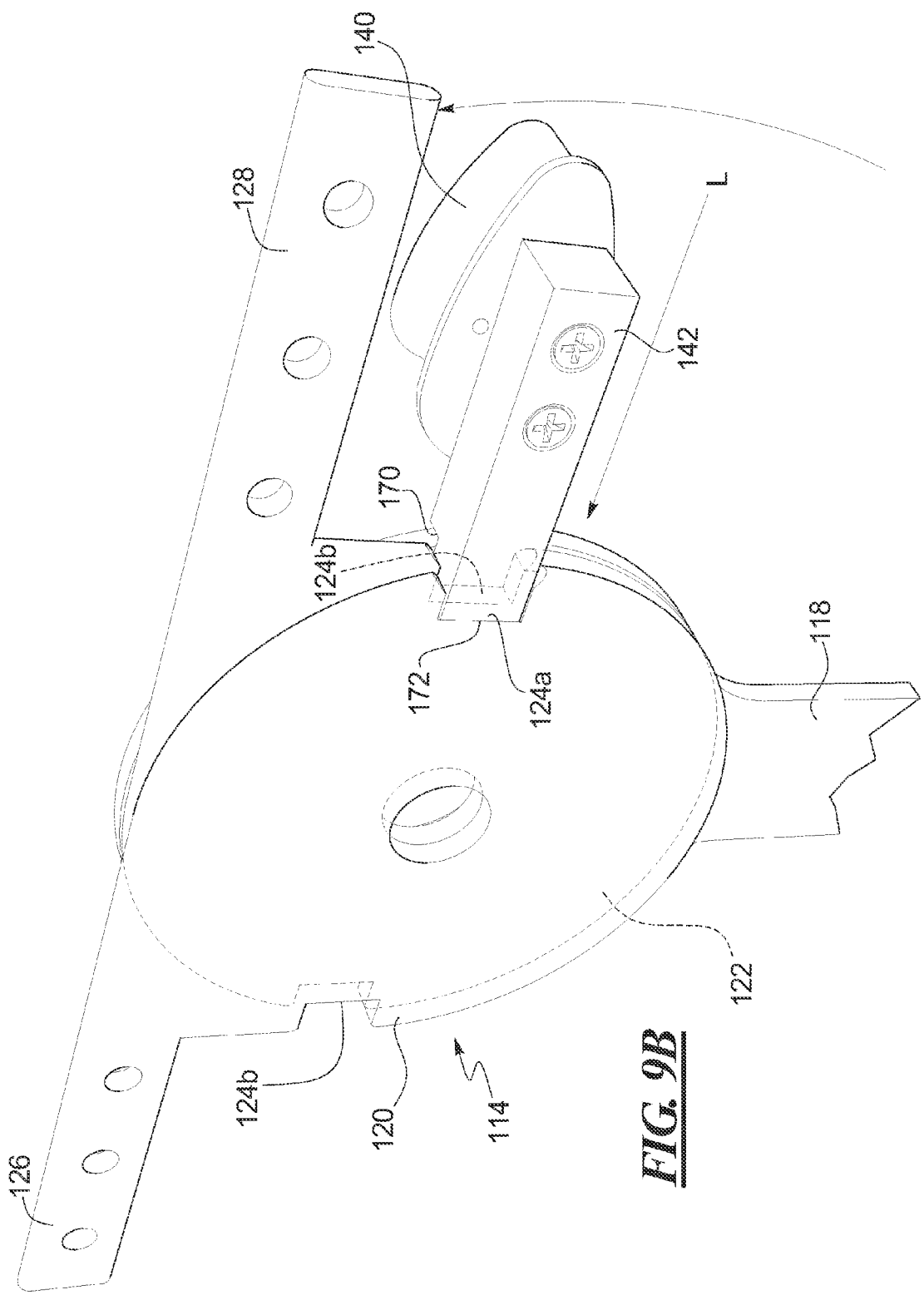
FIG. 9B shows a close-up perspective view of the parts of the rail joint assembly in FIG. 8A, but with the child seat and rail joint assembly in the bassinet mode of FIG. 9A.

Also, the rail lock 133 can be engaged or locked as depicted in FIGS. 6B, 8B, and 9B. In the locked position, the foot rail portion 94 will rotate in concert with the head rail portion 92 about the joint axis J. Thus, the rail plates 120, 122 will both rotate relative to the fixed plate 116. In the locked position, the detent protrusions 154 on the trigger or switch 140 are seated in the locking pair of dimples 152a on the housing surface. In the disclosed example, the lock pin 142 has a stepped or notched working end with a notch 170 that faces the perimeter of the fixed plate 116 and slides along the perimeter as the bassinet rail assembly 90 pivots or moves as the seat back 52 moves. The working end of the lock pin 142 also has a locking portion 172 that extends lengthwise beyond the notch 170. In the locked position, the locking portion 172 of the lock pin 142 seats in the notch 124a of the head rail plate 120 and the notch 124b of the foot rail plate 122. This locks the two rail portions 120 and 122 together. Thus, as the head rail portion 92 moves with the seat back 52, so does the foot rail portion 94. Thus, as shown in FIGS. 4 and 9A, the foot rail portion 94 remains parallel with the head rail portion 92 and is also parallel with the seat bottom and seat back seating surfaces and elevated above them.

In order to return the child seat 22 to the upright seat mode, the user need only manipulate the handle 66 to release the engagement pins 72 from the slots S5 and then rails the seat back 52. This will again rotate the entire locked bassinet rail assembly 90 via the link 160 and the locked rail lock 133.

As shown in FIGS. 4 and 9A, the bassinet rail assembly 90 can have fabric material 174 coupled to the rail portions 92 and 94 and to the seat bottom 50 and seat back 52. When the child seat 22 is in the bassinet mode, the fabric can create bassinet side walls to envelop an infant resting on the seating surfaces. When the child seat 22 is in the upright seat mode of FIGS. 1 and 2, the fabric can bunch up on the sides of the child seat.

Figure 11:
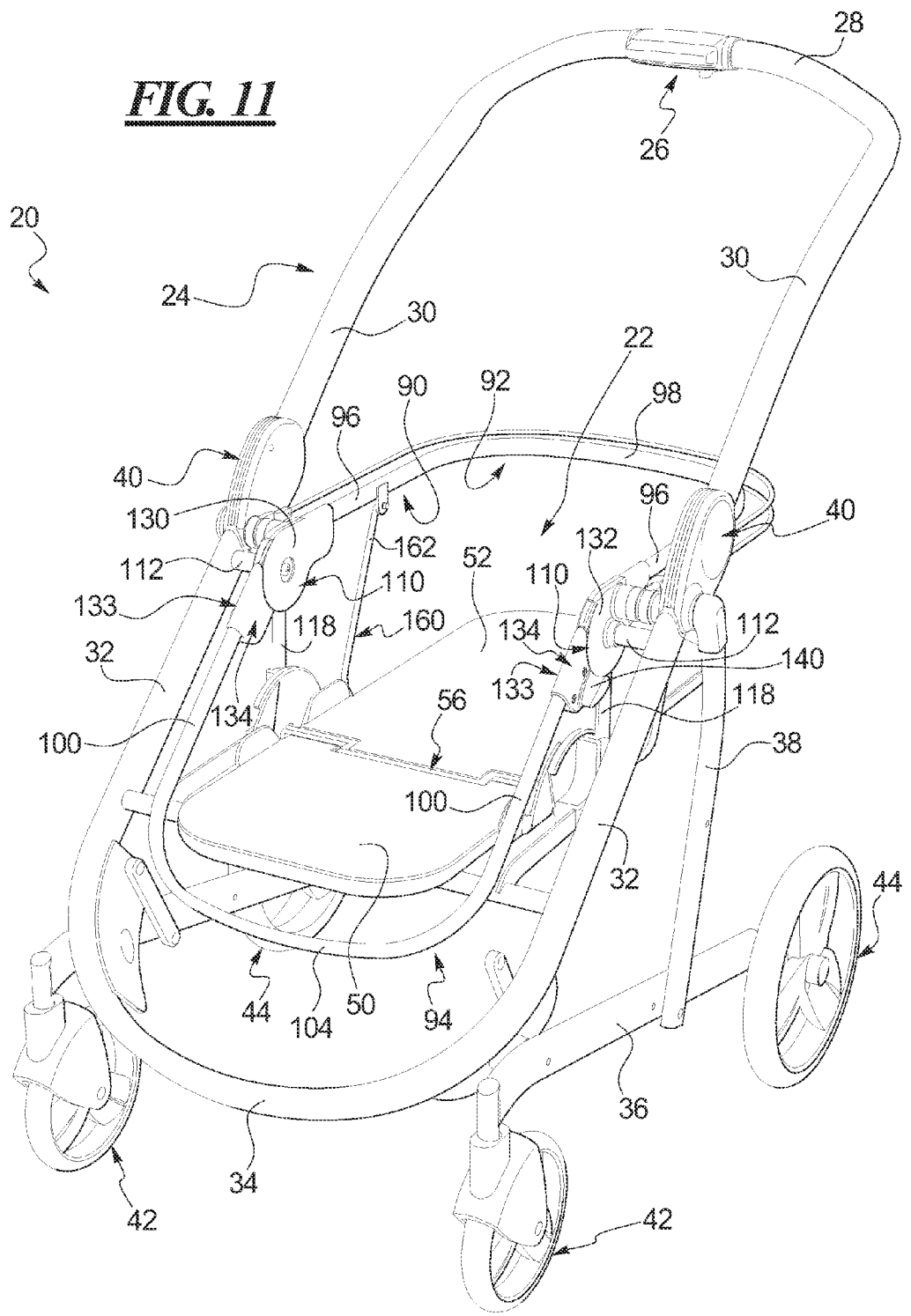
FIG. 11 shows a front perspective view of the stroller and child seat of FIG. 1, but with the child seat in a lie flat toddler position.

The rail lock 133 can also be moved to an unlocked position as shown in FIG. 10 in the direction of the arrow UL. In this position, the detent protrusions 154 will seat in the unlocked pair of dimples 152b on the lock housing surface. When unlocked, the locking portion 172 of the lock pin 142 is withdrawn from the notches 124a of the plate 120 and 124b of the plate 122, which delinks or disengages the connection between the head and foot rail portions 92, 94. The rail lock 133 can be unlocked when the child seat 22 is in the bassinet mode of FIGS. 4 and 9A. If so, gravity will cause the foot rail portion 94 to drop back to its resting position of FIGS. 1 and 2. The child seat 22 and the rail joint assembly 110 will then take on configurations shown in FIGS. 11, 12A, and 12B, respectively. In this configuration, i.e., a toddler lie flat position, the child seat 22 can accommodate a larger child or toddler lying down on the seating surfaces. The fabric wall at the front edge 102 of the seat bottom will be lowered, allowing the child's legs or feet to extend forward beyond the seat bottom. The locking portion 172 of the lock pin 142 will not align with both of the notches in the two plates and will thus be prevented from moving to the locked position in the direction of the arrow L until the foot rail portion 94 is raised back to parallel with the head rail portion 92, which will again align the two notches 124a in the plate 120 and 124b in the plate 122.

Figure 12A:
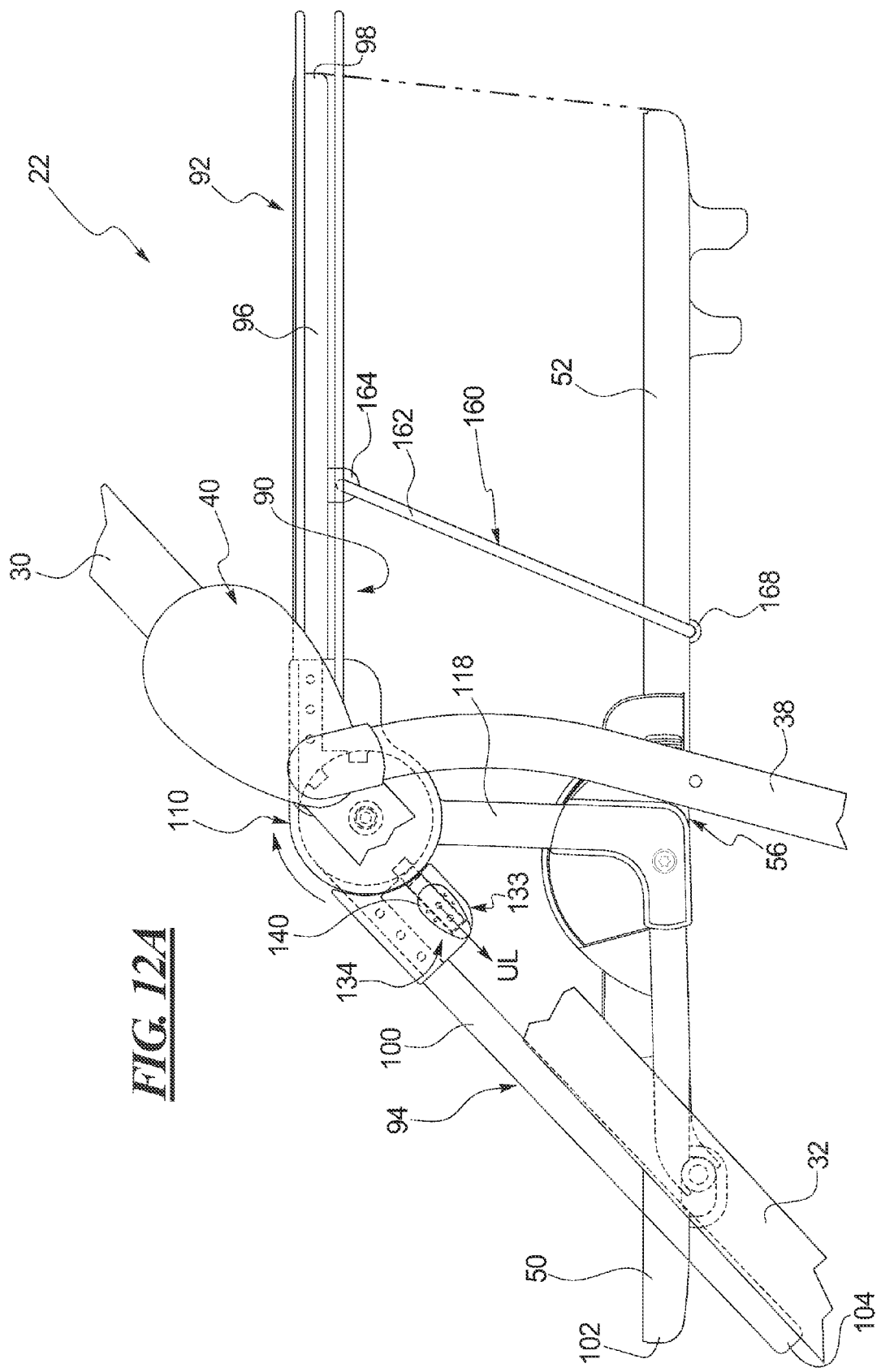
FIG. 12A shows side view of part of the stroller and child seat of FIG. 11.

The rail lock 133 can also be unlocked with the child seat 22 in the upright seat mode of FIGS. 1, 2, and 7. When unlocked, as the user lowers the seat back 52 toward the bassinet mode or lie flat position, the head rail portion 92 will drop as discussed above. However, the foot rail portion 94 will remain in place by gravity, thus achieving the toddler lie flat position of FIGS. 11 and 12A and resulting in the configuration of the rail joint assembly 110 is shown in FIG. 12B.

As only one example of the invention is described herein, details of the various components can be varied from the disclosed example and yet fall within the spirit and scope of the present invention. Details of the rails, rail plates, post, fixed plate, trigger/switch, lock pin, notches, link, and the like can be varied. Details of the trigger or toggle switch for the rail lock function can be varied as well.

In one example, the child seat 22 can be designed to be removed from the stroller 20. The posts can be configured having a quick disconnect between a post top and a connector on the bottom of the rail joint assembly. The axles 112 would be eliminated, which would decouple the child seat from the stroller, other than at the posts. Such post type connections for child seats are known in the art. These can have push button release, a male connector on one part, and a female connector on another part. The button can be pushed to release the child seat from the posts and can be lifted from the stroller.

In another example, the rail joint assembly and/or the seat pivot can be arranged to move both the seat bottom and seat back. The seat bottom can be moved form a non-horizontal orientation in the upright seat mode to a horizontal orientation in the bassinet mode as the seat back is moved. When the seat is returned to the toddler seating position, the seat bottom may be driven backwards and pivoted down, such as by 5degrees when the backrest is released and raised up to the upright position.

The disclosed child seat provides an effortless and inexpensive way to reposition the seat with a minimum number of steps in order to form a bassinet seat configuration. A child retention wall envelops the seat in the bassinet or lay flat configuration. The articulation of the seat back is accomplished with minimal additional components or parts in comparison to known seats of this type.

The respective seat parts of each of the seat bottom, seat back, and head and foot rail portions can be formed from a semi-rigid material, such as a polymer or another suitable material that provides sufficient rigidity for a seated occupant. In the disclosed examples, the seat can have removable soft goods (not shown) placed over a generally rigid supporting structure that may also define and shape at least part of the seat, such as the seat bottom, the seat back, and/or side walls. As will be evident to those having ordinary skill in the art, the configuration and construction of the seat can vary considerably and yet fall within the spirit and scope of the present invention.

The convertible seat can have soft goods to provide the wall extending up from between a perimeter of the seat back and the seat bottom to and enclosing the head and foot bassinet rails. An infant occupant would be safely and conformably contained within the soft goods enclosure in the bassinet seat mode. Further, the soft goods can be made from fabrics chosen for their suitability for use on juvenile products. The soft goods can be color coordinated with other products or to suit consumer tastes.

It should be appreciated that the disclosed example illustrated and described above is for illustration purposes only. Other embodiments may certainly fall within the spirit and scope of the invention. One skilled in the art will appreciate that the seat articulation mechanisms and components could assume any number of different configurations that allow the operator to pivot and cause the seat to move between the toddler seat, toddler sleeping, and infant sleeping positions and/or to adjust the recline position of the seat back.

Any juvenile product that employs a seat could have a seat with the disclosed one-step incline to bassinet feature added. This solution is readily adaptable to strollers, swings, gliders, or the like. The disclosed seat can be fixed to a stroller frame or be removable from any frame structure of a child seating device for mobility or use on the floor.

Although certain juvenile products, strollers, and seat assemblies have been described herein in accordance with the teachings of the present disclosure, the scope of coverage of this patent is not limited thereto. On the contrary, this patent covers all embodiments of the teachings of the disclosure that fairly fall within the scope of permissible equivalents.

The stroller seat essentially forms a parallelogram-like assembly comprising a seat bottom and seat back can be joined with a hinge or pivoting joint at the bight. A fixed pivot to a side frame can be located just behind the bight at the base level of the support when flat. A bassinet railing can be at a level, for example 7 inches, above the seat level and joined with the side frame at a pivot on the rail. The pivot point of the bassinet hub at the level of the railing can be fixed to the stroller frame. There can be another fixed attachment to the stroller frame just aft of the bite on the seat back via a fixed pivot strut. Though described herein as a stroller seat, the disclosed seat could be configured for use on virtually any child seating device, such as a swing, glider, or the like.

What is claimed is:

1. A child seat comprising:
   a seat bottom;
   a seat back pivotally joined to the seat bottom at a seat bight, the seat back and seat bottom movable between a toddler seat position with the seat back raised to a non-parallel orientation relative to the seat bottom and a lie flat position with the seat back lowered to a generally parallel orientation relative to the seat bottom;
   a bassinet rail assembly including a foot rail portion and a head rail portion, the bassinet rail assembly able to move to a bassinet wall configuration around a perimeter of and elevated above the child seat when the seat back is in the lie flat position; and
   a rail lock that, when in a locked position, moves the foot rail portion up to the bassinet wall configuration when the seat back is lowered to the lie flat position, and when in an unlocked position, does not move the foot rail portion up to the bassinet wall configuration when the seat back is lowered to the lie flat position.

2. A child seat according to claim 1, wherein the child seat is joined to a frame assembly of a stroller on each side of the child seat.

3. A child seat according to claim 1, wherein when the child seat is in the lie flat position the foot rail portion can be lowered so that a forward end of the foot rail portion is level with or below an elevation of a front edge of the seat bottom.

4. A child seat according to claim 1, wherein the child seat is attachable to a frame assembly of a stroller and removable from the frame assembly and usable as a separate bassinet.

5. A child seat according to claim 1, further including a rail joint assembly pivotally connecting the foot rail portion with the head rail portion.

6. A child seat according to claim 5, wherein the rail joint assembly carries at least a portion of the rail lock.

7. A child seat according to claim 5, wherein the child seat is joined to a stroller frame of a stroller, the stroller frame have two spaced apart frame sides and the child seat having two of the rail joint assemblies, one on each of the frame sides.

8. A child seat according to claim 7, wherein each of the rail joint assemblies pivots about an axis of a stroller fold joint on the respective frame side.

9. A child seat according to claim 1, wherein the rail lock has a lock housing comprising an inner housing section and an outer housing sections.

10. A child seat according to claim 9, wherein the lock housing includes a lock switch attached to the lock housing.

11. A child seat according to claim 1, wherein rail lock includes a lock switch and detents to provide tactile information to a user as to when the lock switch is in the locked position and in the unlocked position.

12. A child seat according to claim 11, wherein the lock switch is slidable between the locked position and the unlocked position.

13. A child seat according to claim 1, wherein the foot rail portion rotates in concert with the head rail portion when the rail lock is in the locked position.

14. A child seat according to claim 1, wherein the head rail portion rotates separately from the foot rail portion when the rail lock is in the unlocked position.

15. A stroller comprising:
    a frame assembly;
    a child seat mounted to the frame assembly, the child seat having a seat bottom and a seat back pivotally joined to the seat bottom at a seat bight, the seat back and seat bottom movable between a toddler seat position with the seat back raised to a non-parallel orientation relative to the seat bottom and a lie flat position with the seat back lowered to a generally parallel orientation relative to the seat bottom;
    a bassinet rail assembly including a head rail portion and a foot rail portion connected to one another at a rail joint assembly, the bassinet rail assembly able to move to a bassinet wall configuration around a perimeter of and elevated above the child seat when the seat back is in the lie flat position; and
    a rail lock movable between a locked position and an unlocked position, wherein, when the rail lock is in the locked position, the foot rail portion automatically moves up to the bassinet wall configuration when the seat back is lowered to the lie flat position, and, when the rail lock is in the unlocked position, the foot rail portion does not move up to the bassinet wall configuration when the seat back is lowered to the lie flat position.

16. A stroller according to claim 15, wherein the frame assembly has two spaced apart frame sides and the bassinet rail assembly has two of the rail joint assemblies, one on each of the two frame sides.

17. A stroller according to claim 15, further comprising:
    a recline mechanism operatively coupled to the seat back, the recline mechanism having a recline hub with at least two slots that respectively define at least the lie flat position and the toddler seat position for the seat back.

18. A stroller according to claim 17, wherein the hub has at least a third slot defining an intermediate raised position for the seat back between the lie flat and toddler seat positions.

19. A stroller according to claim 17, wherein the recline mechanism further comprises a recline actuator slidably mounted to the seat back and movable to engage or disengage the recline mechanism to prevent or permit, respectively, recline movement of the seat back.

20. A stroller according to claim 15, wherein the child seat is selectively attachable to the frame assembly and removable from the frame assembly and usable as a separate bassinet when removed from the frame assembly.

* * * * *